United States Patent [19]
Yamauchi

[11] Patent Number: 6,033,165
[45] Date of Patent: Mar. 7, 2000

[54] NUMERICAL CONTROL ROUTER ENCLOSED BY A HOUSING

[75] Inventor: Yoshiyuki Yamauchi, Shizuoka-ken, Japan

[73] Assignee: Heian Corporation, Hamamatsu, Japan

[21] Appl. No.: 09/022,601

[22] Filed: Feb. 12, 1998

[30] Foreign Application Priority Data

Jul. 18, 1997 [JP] Japan ................................. 9-209679

[51] Int. Cl.$^7$ .................................................. B23C 1/04
[52] U.S. Cl. ........................ 409/134; 409/192; 409/197
[58] Field of Search .................................. 409/134, 137, 409/189, 192, 197; 29/559; 269/21; 144/252.1

[56] References Cited

U.S. PATENT DOCUMENTS

| | | | |
|---|---|---|---|
| 4,373,406 | 2/1983 | Piotrowski | 409/134 |
| 4,842,455 | 6/1989 | Winkler et al. | 409/134 |
| 4,955,770 | 9/1990 | Kitamura | 409/134 |
| 5,342,156 | 8/1994 | Baba | 409/134 |
| 5,423,359 | 6/1995 | Aigner | 409/134 |
| 5,658,105 | 8/1997 | Takahashi | 409/134 |
| 5,775,395 | 7/1998 | Wilkins | 409/137 |
| 5,836,064 | 11/1998 | Winkler et al. | 409/134 |

Primary Examiner—Daniel W. Howell
Attorney, Agent, or Firm—Burgess, Ryan & Wayne

[57] ABSTRACT

A numerical controlled router having a housing mounted on a support structure wherein an opening of the housing is formed in front of a head structure and a table support member is provided outside of the housing, a suction table is rotatably supported by the table support member, and a table rotating cylinder for rotating the suction table extends through a cut-out portion of the table support member.

5 Claims, 4 Drawing Sheets

NUMERICAL CONTROL ROUTER ENCLOSED BY A HOUSING

BACKGROUND OF THE INVENTION

The present invention relates to a numerical controlled router enclosed by a housing having an opening which is closed by a suction table.

RELATED ART

In a numerical controlled router for making a process board of the prior art, rails are provided on a horizontal beam supported by a supporting structure on a base; a head structure is supported by the rails to move horizontally, a downwardly movable head having motors is mounted thereon with machine tools such as drills or cutters which are attached to the shafts of the motors.

A suction table mounted on rails beneath the table is arranged below the downwardly movable head. A suction table on which a process board is mounted is moved back and forth on the rails below the head structure.

Since the numerical control router is not covered by any housing and the suction table is moved under the heads, wood chips and dust are scattered on and near the process board and the suction table when the process board is machined and noise is generated when the process board is machined.

SUMMARY OF THE INVENTION

It is, therefore, an object of the present invention to provide a numerical controlled router enclosed by a housing in which chips and dust are contained when a process board is machined.

It is another object of the present invention to provide a numerical controlled router enclosed by a housing having a suction table by which the opening of the housing is closed and opened.

It is another object of the present invention to provide a numerical controlled router enclosed by a housing having a suction table from which a processed process board is removed and on which a new process board can be mounted when the housing is opened by rotation of the suction table.

In order to accomplish the above and other objects, the present invention comprises a horizontally movable member arranged to move along horizontally arranged rails mounted on the side of a support structure, a vertically movable member which moves along vertical rails arranged on the horizontally movable member, a head structure mounted on the vertically movable member, heads having machining tools such as drills and cutters respectively movable on the head structure by a moving means such as a cylinder in a direction toward and away from a process board being machined and a housing enclosing and surrounding the horizontal movable member, the vertically movable member and the head structure. The housing is supported by the support structure having an opening in front of the head structure, a table support means is arranged on the support structure to rotatably support a suction table, a table rotating means for rotating the suction table arranged on the support structure and a moving shaft connected to the suction table, whereby a process board can be mounted on the suction table, the opening of the housing being closed by rotation of the suction table by the table rotating means whereby the process board is moved to a position whereby it is machined in a closed housing.

DESCRIPTION OF THE PREFERRED EMBODIMENTS

Figure 1:
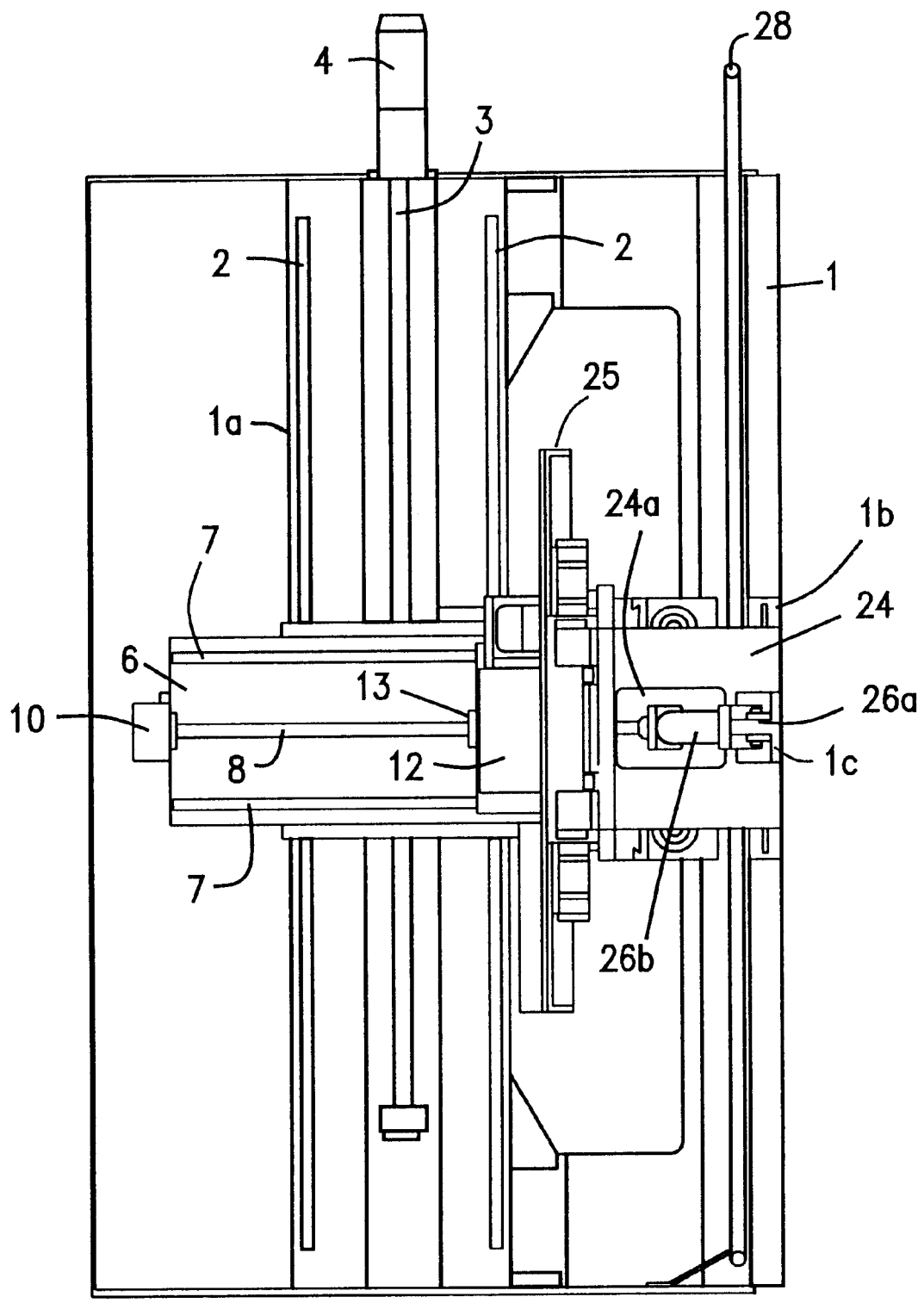
FIG. 1 is a front view with the housing removed of a numerical controlled router of the invention.
Figure 2:
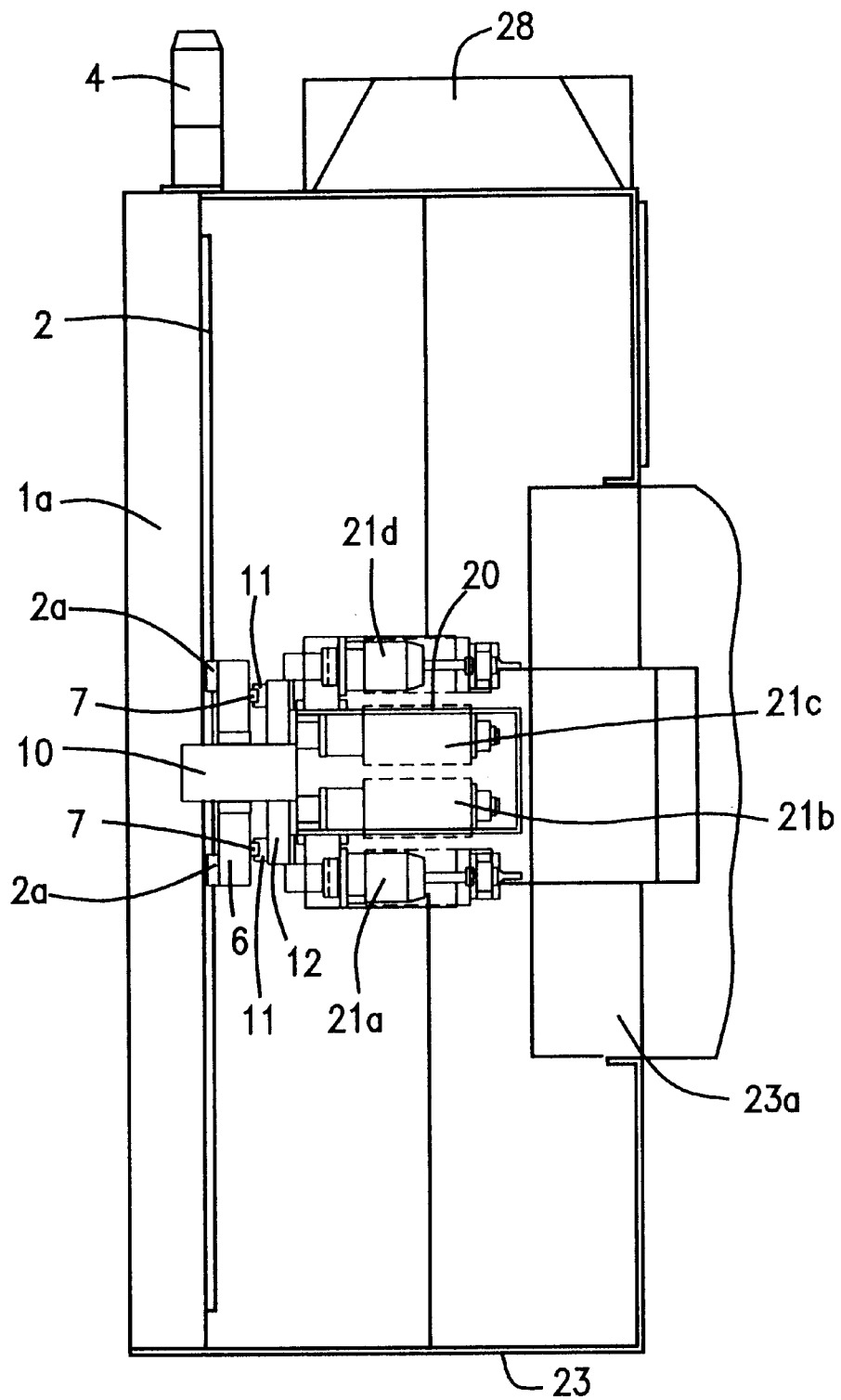
FIG. 2 is a plan view with the housing removed of a numerical controlled router of FIG. 1.
Figure 3:
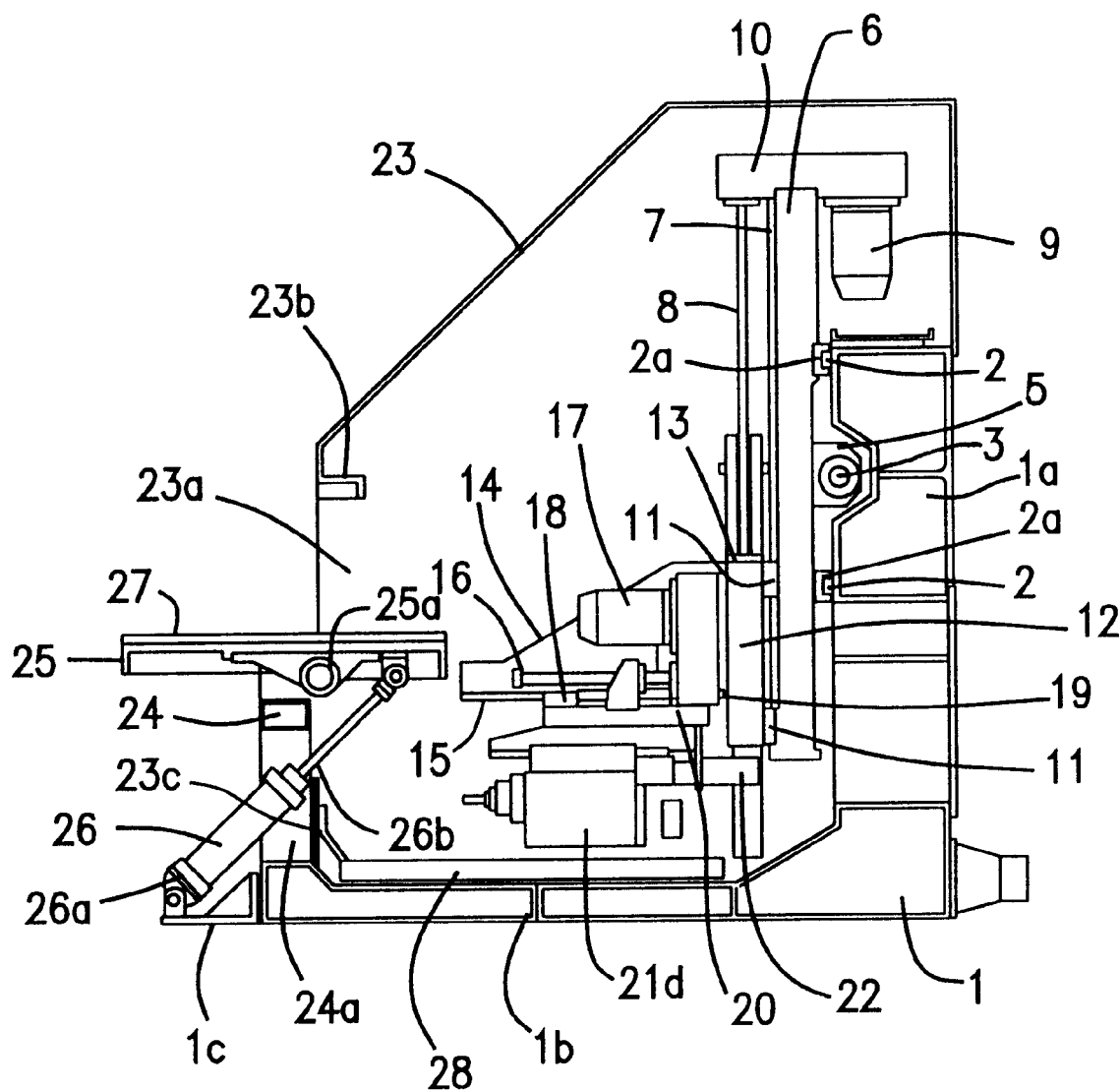
FIG. 3 is a right side view in partial cross-section of a numerical controlled router of FIG. 1.

As shown in FIGS. 1, 2 and 3, a horizontal beam member 1a is arranged on a support structure 1. Horizontal rails 2 are arranged on the side of the horizontal beam member 1a. A screw shaft 3 is arranged in a hollow portion of the horizontal beam member 1a between the horizontal rails 2. The screw shaft 3 is rotated by a motor 4; sliding bearings and supports 2a and 2b engage the horizontal rails 2 and a screw engaging member 5 is provided on a horizontally movable member 6 between the bearings 2a and 2b.

Vertical rails 7 are arranged on a front face of the horizontally movable member 6. A screw shaft 8 is arranged on the horizontally movable member 6 between the vertical rails 7 and is connected by a connecting member 10 to be rotated by a servomotor 9 arranged at the top portion of the horizontally movable member 6. Slidable bearings and supports 11 engage the vertical rails 7 and a screw engaging. member 13 engages the screw shaft 8 to move the vertically movable member 12.

Rails 15 are mounted on a lower surface of a structure supporting member 14 mounted on the vertically movable member 12. A screw shaft 16 arranged in parallel to rails 15 is arranged on the structure supporting member 14 and is rotated by a servomotor 17. Bearings and support 18 which engage rails 15 and a screw engaging member 19 are mounted on a head structure 20, and heads 21a, 21b, 21c and 21d are arranged on the head structure 20 so they can be moved toward and away from a process board during the machining of the process board.

A housing 23 is supported by the horizontal beam member 1a and the beam member 1b of the support structure 1. An opening 23a of the housing 23 is formed in front of the head structure 20. A suction table supporting member 24 is arranged on the beam member 1b and a suction table 25 is attached to a rotation shaft 25a rotatably mounted on the table supporting member 24. An open portion 24a is formed at the center of the table supporting member 24. The base member 26a of a table rotating cylinder 26 is rotatably connected to a cylinder supporting member 1c in a portion of the beam member 1b. A moving shaft 26b of the table rotating cylinder 26 is connected to the suction table 25. An upper support 23b is arranged at the top of the opening 23a of the housing 23 for contact with suction table 25 upon rotation of the suction table 25. An under support 23c is attached to the inside of the table supporting member 24.

Figure 4:
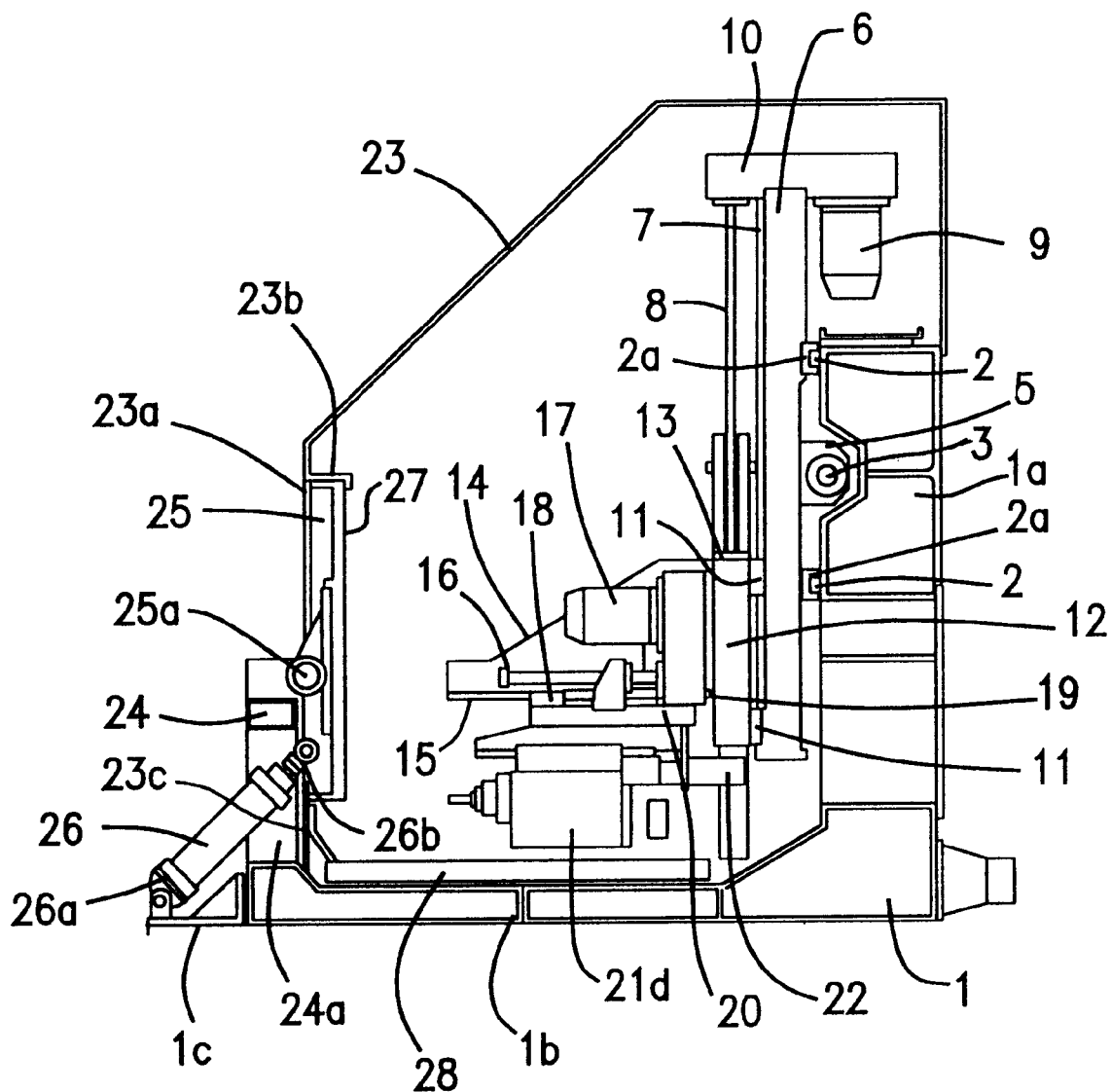
FIG. 4 is a right side view in partial cross-section illustrating motion of the suction table.

In the numerical controlled router of the invention, as shown in FIG. 3, the suction table 25 is maintained in a horizontal position by extending the moving shaft 26b of the table rotating cylinder 26. Therefore, after a process board 27 is placed on the suction table 25, the suction table 25 is rotated by retracting the shaft 26b of the table rotating cylinder 26, as shown in FIG. 4. The upper end of the suction table 25 abuts against the upper support 23b and the lower end of the suction table 25 abuts against the under support 23c, whereby the suction table 25 is vertically positioned to close the opening 23a of the housing 23.

Then the head structure 20 is positioned by moving the horizontally movable member 6 and the vertically movable member 12 by the servomotors 4 and 9. Then the head structure 20 is moved to a predetermined position by the servomotor 17. The process board 27 supported by the vacuum on the suction table 25 is machined by the heads 21a to 21d which are horizontally moved by the moving means 22.

By vertically positioning the process board 27, the wood chips scattered during the machining fall below the suction table 25. Wood chip scattering is stopped by the housing 23. Therefore, it is not necessary to sweep the process board and the suction table. Also, the process board 27 can be easily changed to a new process board by rotating the suction table 25 to a horizontal position.

The inner portion of the housing 23 can be cleaned at predetermined intervals. A factory in which the numerical controlled router of the present invention is used, is kept clean and it is fairly quiet because the noise is absorbed by the housing 23.

A belt conveyer 28 can be arranged on the support member 1b of the support structure 1 and the end of the belt conveyer 28 can project outside the housing 23; the fallen wood chips and dust are collected outside of the housing 23.

The computers which control numerical machining apparatus are well known and can be easily programmed to operate the various positioners and movers and need not be discussed in detail here.

What is claimed is:

1. A numerical controlled router enclosed by a housing comprising:

a horizontally movable member movable on horizontal rails arranged on a side of a support structure, a vertically movable member which moves on vertical rails arranged on the horizontally movable member, a head structure mounted on the vertically movable member, heads having machine tools mounted thereon respectively moved back and forth on the head structure, a housing enclosing and surrounding the horizontally movable member, the vertically movable member and the head structure, the housing being supported by the support structure and having an opening in front of the head structure, a table support member arranged on the support structure at the opening of the housing, a suction table rotatably supported by the table support member and a table rotating means for rotating the suction table arranged on the support structure whereby a process board is mounted on the suction table and the opening of the housing closed by rotation of the suction table by the table rotating means whereby the process board can be processed in a closed housing.

2. The numerical controlled router enclosed by a housing as set forth in claim 1 wherein a belt conveyer is mounted on a member of the support structure and an end of the belt conveyer projects outside the housing.

3. The numerical controlled router of claim 1 wherein the table rotating means comprises a table rotating cylinder having an extending shaft rotatably connected to one of the suction tables or the support structure.

4. The numerical controlled router of claim 2 wherein the table rotating means comprises a table rotating cylinder having an extending shaft rotatably connected to one of the suction tables or the support structure.

5. The numerical controlled router of claim 3 having a belt conveyor mounted on a member of the support structure and an end of the belt conveyor projects outside the housing.

* * * * *